Patented Apr. 18, 1950

2,504,165

UNITED STATES PATENT OFFICE 2,504,165

METHOD OF PRODUCING TETRAETHYL PYROPHOSPHATE

Arthur Dock Fon Toy, Chicago, Ill., assignor to Victor Chemical Works, a corporation of Illinois No Drawing. Application March 21, 1947, Serial No. 736,411

11 Claims. (Cl. 260—461)

This invention relates to a method of producing tetraethyl pyrophosphate esters.

Tetraethyl pyrophosphate esters have been produced with various reactants and under various conditions in the past, but all these prior methods of preparation, of which I am aware, have resulted in extremely low yields and impure products. I have discovered a method of producing the esters that produces an extremely high yield and a product of a very high degree of purity.

It has been found that under controlled conditions, two moles of diethyl halogen-phosphate such as the chlorophosphate may be reacted with one mole of water to form tetraethyl pyrophosphate with liberation of hydrogen halide. Removal of the hydrogen halide from the reaction mixture causes the reaction to proceed more smoothly and give higher yields and a purer product.

The equation for the reaction where the chlorophosphate is used may be written as follows:

Removal of hydrogen chloride from the reaction zone may be accomplished by the use of vacuum, or preferably by the addition of organic and inorganic bases such as pyridine, tertiary amines, sodium bicarbonate, sodium carbonate, and the like to serve as hydrogen chloride acceptors during the reaction. Such hydrogen chloride removing compounds react with the hydrogen chloride as it is liberated to form chlorides or hydrochlorides which are substantially insoluble in the pyrophosphate esters and which generally may be separated by filtration.

The following examples illustrate the general nature of the new process.

Example I.—In a one-liter, two-necked round-bottom flask equipped with a thermometer, capillary tubes for air and water, and a vacuum connection, was placed 151 grams (0.86 mole) of diethyl chlorophosphate

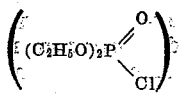

7.9 grams (0.438 mole) of water was slowly added through a capillary tube while maintaining the temperature at 31–33° C. and a pressure of about 8–10 mm. Hg. After completing the water addition, the system was held at room temperature under vacuum at a pressure of 5 to 8 mm. Hg for about 17 hours and then heated slowly at 3–4 mm. pressure to separate the reaction products by fractional distillation.

The first low boiling fraction, weighing 52 grams, was found to be unreacted diethyl chlorophosphate and was recovered for reuse in the process.

The second fraction, 61 grams, had a boiling point of 134–138° C. at a pressure of about 1 mm. Hg and was substantially pure tetraethyl pyrophosphate. It had an index of refraction of $N_D^{25} = 1.4185$, a specific gravity at 24° C. of 1.1901 and at 17° C. was 1.1978. It had an actual phosphorus content of 21.5% compared to the theoretical of 21.4%. The amount recovered represented a 73.2% yield based on the amount of $(C_2H_5O)_2POCl$ reacted. The ester was completely soluble in water and could be redistilled without decomposition.

The above example illustrates the process wherein the hydrogen chloride was removed from the reaction mass by means of vacuum.

Example II.—In a three-necked 500 cc. flask equipped with a stirrer, a thermometer and a dropping funnel, was placed 133.7 grams (0.775 mole) of diethyl chlorophosphate ($(C_2H_5O)_2POCl$) dissolved in 145 cc. of ether. To this was slowly added a mixture of 7.14 grams (0.396 mole) of water and 62.7 grams (0.794 mole) of pyridine dissolved in 100 cc. of ether at 0° C. Approximately one hour was required for the addition. The flask was cooled by means of an ice-salt bath to 0–2° C. The mixture was stirred in the cold for about 20 minutes and allowed to come to room temperature overnight. The insoluble pyridine hydrochloride formed by combination with the liberated hydrogen chloride was filtered off and washed three times with 50 cc. portions of ether. The combined filtrate and ether washings was then heated at atmospheric pressure to distill off most of the ether and then distilled under vacuum. The first small fraction to distill over contained the remaining ether, a small amount of pyridine hydrochloride and a low boiling liquid. The main fraction amounting to 101 grams had a boiling point of 128–134° C. at a pressure of 0.5 to 1.0 mm. Hg. This fraction represented a yield of 89.3% of substantially pure tetraethyl pyrophosphate having an index of refraction of $N_D^{25} = 1.4183$.

Example III.—Example 2 was repeated with the exception that no ether solvent was employed. After the addition of the water and pyridine was completed at about 0–2° C., the mixture was stirred for 20 minutes, then allowed to come to room temperature and stirred for about 30 minutes, then heated to about 35° C. The mixture was then cooled and the pyridine hydrochloride filtered off. The residue was washed twice with 45 cc. portions of ether to remove the entrained ester. The filtrate was then distilled as in Example 2. 99 grams of substantially pure tetraethyl pyrophosphate was obtained representing a yield of 88%.

*Example IV.*—Example 2 was repeated except that the amount of water added was doubled. After separating the ether-ester mixture from the insoluble pyridine hydrochloride, is was distilled to remove the ether and low-boiling fraction and then distilled under vacuum to recover the tetraethyl pyrophosphate fraction. This fraction collected at 130–136° at about 1 mm. pressure amounted to 101 grams and represents a yield of 89.9%.

*Example V.*—Example 2 was again repeated but this time using four times the amount of water used in Example 2, or two times that used in Example 3. The tetraethyl pyrophosphate ester obtained in this case amounted to 80 grams of a yield of only 71%. This example shows that the yield is considerably reduced when too much excess water is used over that theoretically required. On the other hand, it is remarkable that any pyrophosphate ester at all should be produced under these circumstances since the excess water should tend to produce acid orthophosphate esters in accordance with the reaction

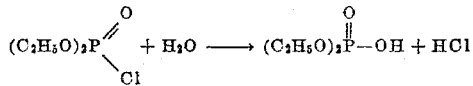

This type reaction as well as the hydrolysis of the pyrophosphate ester are promoted by excess water and by increase in the reaction temperature. Therefore, it is desirable to carry out the reaction at low temperatures of the order of 0–10° C., though much higher temperatures may be employed if the amount of water is controlled to avoid large excesses over that required for the equation:

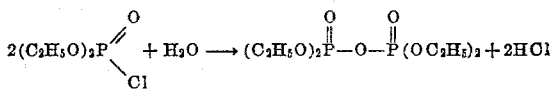

While the above examples illustrate the lowering of the yield from about 90% to 70% by increasing the water from one to four times the amount theoretically required, it is not considered impractical to operate the process with yields of 70% or even lower.

It is believed that the condensation reaction with the formation of the pyrophosphate ester is substantially the only reaction which takes place at the low temperatures, while at higher temperatures the competing reaction for the formation of acid orthophosphate ester takes place to some extent. Hydrolysis of the pyrophosphate ester to form acid orthophosphate esters probably proceeds at a relatively slow rate in the cold even in the presence of a large excess of water. Therefore, it is possible to control the reaction to produce the pyrophosphate ester even with an indefinitely large initial excess of water provided that low reaction temperatures are maintained and that in the final mixture, the excess water is not substantially greater than 100 to 300% over that theoretically required. This point is illustrated in the following example where the diethyl chlorophosphate is slowly added to the water instead the reverse or preferred procedure.

*Example VI.*—14.28 grams (0.794 mole) of water, 62.7 grams (0.794 mole) of pyridine, and 200 cc. of ether were placed in a reaction vessel, and 133.7 grams (0.775 mole) of diethyl chlorophosphate dissolved in 45 cc. of ether was slowly added while maintaining the reaction mixture at about 0 to 2° C. After completing the addition, the reaction mixture was allowed to come to room temperature when the pyridine hydrochloride, formed by absorption of the HCl liberated, was filtered off and washed with three 50 cc. portions of ether. The combined filtrate was heated under vacuum (approximately 6 mm. pressure) at about 40° C. for one hour to distill off the ether, excess water and low-boiling material. The residue representing the crude tetraethyl pyrophosphate was obtained in substantially theoretical yield. The ester product analyzed 21.2% P and 0.7% Cl compared to the theoretical of 21.4% P and 0% Cl. On redistillation, the small amount of chloride was eliminated and the P content was 21.3%. The boiling point was 126–130° C. at 0.5 to 1.0 mm. pressure.

The following example illustrates the use of an inorganic base to remove the liberated hydrogen chloride from the reaction:

*Example VII.*—86.2 grams (0.5 mole) of diethyl chlorophosphate was placed in a reaction flask and one gram of water added at 26° C. while stirring. 43.05 grams (0.512 mole) of powdered sodium bicarbonate was then added. The small amount of free water added initiated the reaction which then proceeded by reaction with water liberated as the sodium bicarbonate reacted with the liberated hydrogen chloride. The heat of reaction caused the temperature to rise to about 35° C. The reaction mass was then cooled to about 30° C. by external cooling. The reaction flask was then placed under slight vacuum to facilitate removal of carbon dioxide while the stirring of the mass was continued. After about 2 hours, the temperature had dropped to about 26° C. The mixture was then filtered and the residue washed twice with 15 cc. portions of benzene. The filtrate, including the benzene washings, was then distilled under vacuum. The benzene, excess water, and a small amount of a low-boiling material were distilled off first. The main fraction of 59.5 grams boiling at 125–130° C. at less than 1 mm. Hg. pressure was substantially pure tetraethyl pyrophosphate, and represented a yield of 82%.

*Example VIII.*—86.2 grams of diethyl chlorophosphate was placed in a reaction flask, 1 gram of water added and the mixture stirred for 5 minutes after which 27.8 grams of soda ash was added in two portions. The reaction temperature was maintained at about 32–34° C. by means of a water bath. After stirring the reaction mixture at this temperature for 5½ hours, it was allowed to stand overnight at room temperature. As in the previous example, the reaction proceeded by reacting with the water released as the liberated hydrogen chloride reacted with the sodium carbonate to form sodium chloride, water, and carbon dioxide. After the mixture had stood overnight, it was filtered and the sodium chloride residue washed with benzene. The filtrate, including the benzene washings, was then heated under vacuum to remove the benzene, water and low-boiling fraction. The higher-boiling fraction representing 63 grams of the crude ester product was refractionated to yield 54 grams of pure tetraethyl pyrophosphate, representing a yield of approximately 78%.

In all of the above examples the pyrophosphate ester is formed either at very low temperatures or before any substantial amount of excess water is present in the reaction zone. Excess water is undesirable, but its use up to a reasonable amount of 300% over the theoretical amount is possible since reasonably high yields of the pyrophosphate ester can be obtained by controlling the temperature conditions of the reaction. The excess water present, after the pyrophosphate ester is formed, may be removed by distillation without undue hydrolysis of the ester unless too large an amount of water must be removed. As shown by Example 5, the removal of 300% excess water resulted in about a 20% lower yield of the pyrophosphate ester, whereas the removal of 100 to 200% excess water did not have much effect on the yield in the other examples.

Having described my invention in considerable detail, it is my intention that the invention be not limited by any of the details of description unless otherwise noted, but rather be construed broadly within its spirit and scope as set out in the accompanying claims.

I claim:

1. The method of producing tetraethyl pyrophosphate which comprises associating diethyl chlorophosphate with water at a temperature of from 0° to 35° C. to form the pyrophosphate ester and hydrogen chloride, and removing the hydrogen chloride substantially as it is formed, the time of contact of the reactants being limited so that the pyrophosphate ester is not appreciably further hydrolyzed.

2. The method of claim 1 wherein the reactants are present in the ratio of two moles of the diethyl chlorophosphate to from 1 to 4 moles of water.

3. The method of claim 1 wherein the reactants are present in the ratio of two moles of the diethyl chlorophosphate to from 1 to 4 moles of water, and the temperature is from 0° to 10° C.

4. The method of claim 1 wherein a basic compound is added to the reaction mixture to take up the hydrogen chloride substantially as it forms.

5. The method of claim 1 wherein two moles of the diethyl chlorophosphate are associated with from 1 to 2 moles of water.

6. The method of claim 1 wherein pyridine is used to take up the liberated hydrogen chloride.

7. The method of claim 1 wherein sodium bicarbonate is used to take up the liberated hydrogen chloride.

8. The method of claim 1 wherein the hydrogen chloride is removed by means of vacuum.

9. The method of claim 1 wherein a basic compound is added to the reaction mixture to take up the hydrogen chloride substantially as it is formed; and the tetraethyl pyrophosphate is separated from the chloride containing base and purified by fractional distillation.

10. The method of claim 1 wherein two moles of the diethyl chlorophosphate are reacted with approximately one mole of water.

11. The method of producing tetraethyl pyrophosphate which comprises associating diethyl halogen-phosphate with water at a temperature of from 0° to 35° C. to form the pyrophosphate ester and hydrogen halide, and removing the hydrogen halide substantially as it is formed, the time of contact of the reactants being limited so that the pyrophosphate ester is not appreciably further hydrolyzed.

ARTHUR DOCK FON TOY.

REFERENCES CITED

The following references are of record in the file of this patent:

Wichelhaus "Annalen der Chemie (Liebigs)," Supplement vol. 6 (1868), pages 262–264.